(12) United States Patent
Schell et al.

(10) Patent No.: US 7,680,676 B2
(45) Date of Patent: Mar. 16, 2010

(54) METHOD FOR PRODUCING PROGRAMMING ELEMENTS FOR BROADCAST STATIONS

(76) Inventors: Randy Schell, 1615 Rockin Dr., Houston, TX (US) 77077; Lorraine Barrow, 2916 John Bunch Rd., Sulphur, LA (US) 70663

( * ) Notice: Subject to any disclaimer, the term of this patent is extended or adjusted under 35 U.S.C. 154(b) by 1242 days.

(21) Appl. No.: 11/204,198

(22) Filed: Aug. 15, 2005

(65) Prior Publication Data

US 2006/0041449 A1 Feb. 23, 2006

Related U.S. Application Data

(60) Provisional application No. 60/602,104, filed on Aug. 17, 2004.

(51) Int. Cl.
*G06Q 10/00* (2006.01)
*G06Q 30/00* (2006.01)
*H04B 1/38* (2006.01)
*H04M 11/00* (2006.01)
*H04M 1/00* (2006.01)
*G06F 7/00* (2006.01)
*G06F 17/30* (2006.01)

(52) U.S. Cl. .................. 705/1; 455/403; 455/550.1; 455/91; 707/1

(58) Field of Classification Search .............. None
See application file for complete search history.

(56) References Cited

U.S. PATENT DOCUMENTS 3,896,490 A * 7/1975 Rose et al. .................. 360/69

2002/0095330 A1 * 7/2002 Berkowitz et al. ............ 705/14
2003/0004793 A1 * 1/2003 Feuer et al. ................... 705/14
2003/0005052 A1 * 1/2003 Feuer et al. ................. 709/204
2003/0008627 A1 * 1/2003 Efron et al. ................. 455/143

OTHER PUBLICATIONS

Milligan, Tara. "LocalTV, radio stations produce most local ads that air." Memphis Business Journal Sep. 14, 2001: www.bizjournals.com. May 29, 2009 <http://www.bizjournals.com/memphis/stories/2001/09/17/focus1.html>.*

Nunley, Kevin. "How to advertise your business or web site on radio." Website Advertising Apr. 24, 2004: Developer Shed. May 29, 2009 <http://tools.devshed.com/c/a/Website-Advertising/How-to-advertise-your-business-or-web-site-on-radio/>.*

(Continued)

*Primary Examiner*—John G Weiss
*Assistant Examiner*—Shaun Sensenig
(74) *Attorney, Agent, or Firm*—Buskop Law Group, PC; Wendy Buskop

(57) ABSTRACT

A method for producing a programming element for a broadcast station entails generating an order in a database to produce a recorded announcement and identifying the script for the order. The script and an order are stored at a first location in the database by the salesman. The method continues by recalling the order from the database by a traffic director, assigning a cart number to the order, and storing the script and cart number at a second location in the database. The stored script, order and cart number are recalled from the second location by a producer at the broadcast station. The producer locates elements required in the script and produces the recorded announcement. The recorded announcement is stored at a third location with the order in the database. The method ends by retrieving the stored recorded announcement for use by the broadcast station.

19 Claims, 5 Drawing Sheets

OTHER PUBLICATIONS

Landsberg, Hank. "Production of Automation Music Programming Tapes at Drake-Chenault May 1, 2002." Jun. 1, 2009: Drak Chenault. May 29, 2009 <http://www.drakechenault.org/textpg.html>.*

Northwestern Mutual; Radio Advertising Order From/Radio Script Planner. <http://web.archive.org/web/20041025142941/http://www.nmfnprint.com/adkit/images/forms/radio_order.pdf> Jun. 12, 2004 May 30, 2009.*

* cited by examiner

METHOD FOR PRODUCING PROGRAMMING ELEMENTS FOR BROADCAST STATIONS

CROSS REFERENCE TO RELATED APPLICATIONS

The present application claims priority to U.S. Provisional Patent Application Ser. No. 60/602,104, filed on Aug. 17, 2004.

FIELD

The present embodiments relate to handling production orders and making commercials, traffic reports, and similar short programs for radio stations.

BACKGROUND

Commercials have long been an integral part of entertainment programming. From the major television networks to the local radio station operators, they all rely on advertisers for their revenues. As a result, the large majority of entertainment programming, whether it is television or radio, whether it is news, sports, soap operas or talk shows, they are all interposed with commercials at selective breakpoints of the programs. Even for video tapes, CDs, or DVDs, more and more commercials are placed at the beginning as well as the end of the feature presentations.

A need exists for an easy, automated method to handle production orders and the associated producing of commercials and other recorded announcements for radio stations making and broadcasting commercials which includes a salesman, producer and traffic director.

A need exists for a method to produce recorded spots at radio and television stations that is more environmentally friendly, saving paper over methods that currently exist.

A need exists for a method for radio stations and television stations to easily comply with the Sarbanes/Oxley suggested rules for corporate accountability. The record keeping now required under these new rules will be improved using this new method.

The present embodiments meet these needs.

SUMMARY

Methods for producing a programming element for a broadcast station entails a salesman generating an order in a database to produce a recorded announcement at the broadcast station with a script and traffic instructions. The script is copy and instructions for audio. The order and attached script are stored at a first location in the database by the salesman. The methods continue by recalling the order from the database by a traffic director at the broadcast station using the traffic instructions, assigning a cart number to the order, and storing the order with attached script and cart number at a second location in the database. The stored order is recalled from the second location by a producer at the broadcast station. The producer locates elements required in the script and produces the recorded announcement. The recorded announcement is attached to the order and stored at a third location in the database. The methods end by retrieving the stored recorded announcement for use by the broadcast station.

BRIEF DESCRIPTION OF THE DRAWINGS

The detailed description will be better understood in conjunction with the accompanying drawings as follows.

The present method is detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodied methods provide fast, computer assisted methods to increase radio and broadcast station commercial production. The methods enable a station to track salesman production, as well as team production and team efficiency at the station.

The method for producing a programming element for a broadcast station enables a faster, more efficient, computer based system to track and store easily searchable items, such as scripts, customer information, audio files, and scheduling information, and for retrieval and report generation.

When used in conjunction with a broadcast station, the embodied methods provide more efficient methods for running a radio station or other broadcast station, such as a television station for higher profitability. The methods reduce the amount of research time needed to produce similar commercials or recorded announcements for existing clients using similar material.

The embodied methods provide environmentally friendly, potentially paperless methods for handling the production of commercials, and other recorded spots. Currently, commercial spots and the associated production generate reams and reams of paper. These embodied methods reduce the amount paper used by the over 10,000 radio stations currently operating in the United States. Even if just a small station utilizes the embodied method and saves at least one ream of paper per day, 365 reams a year of paper; the savings to the forests and paper consumption will be enormous.

Embodied herein are methods for automated order production and broadcast for a broadcast station, such as a radio station. The methods can be used by entities that run commercials during broadcasts. Examples of on-air workstations include broadcast radio stations, broadcast television stations, satellite radio stations, satellite television stations, internet radio stations, internet television stations, cable radio stations, networks (such as, NBC or ESPN), or cable television stations. The methods can be used on wireless services to produce commercials over a wireless network.

Figure 1:
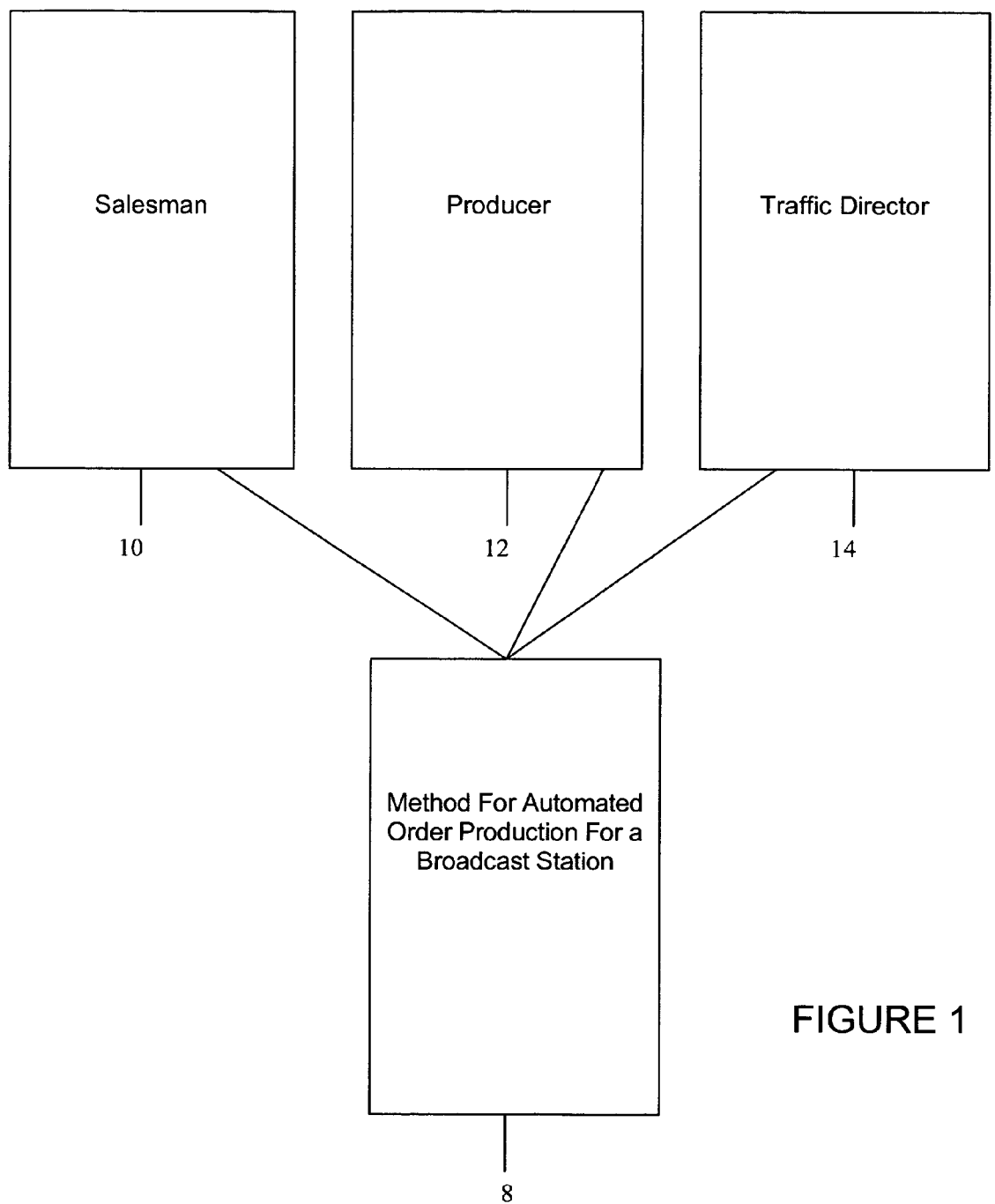
FIG. 1 is a basic schematic of an embodiment of a method for automated order production for a broadcast station.

With references to the figures, FIG. 1 depicts an embodied method 7 composed of three or more modules integrated together to create a method for automated order production for a broadcast station. The three modules utilize a salesman 10, a producer 12, and a traffic director 14.

Figure 2:
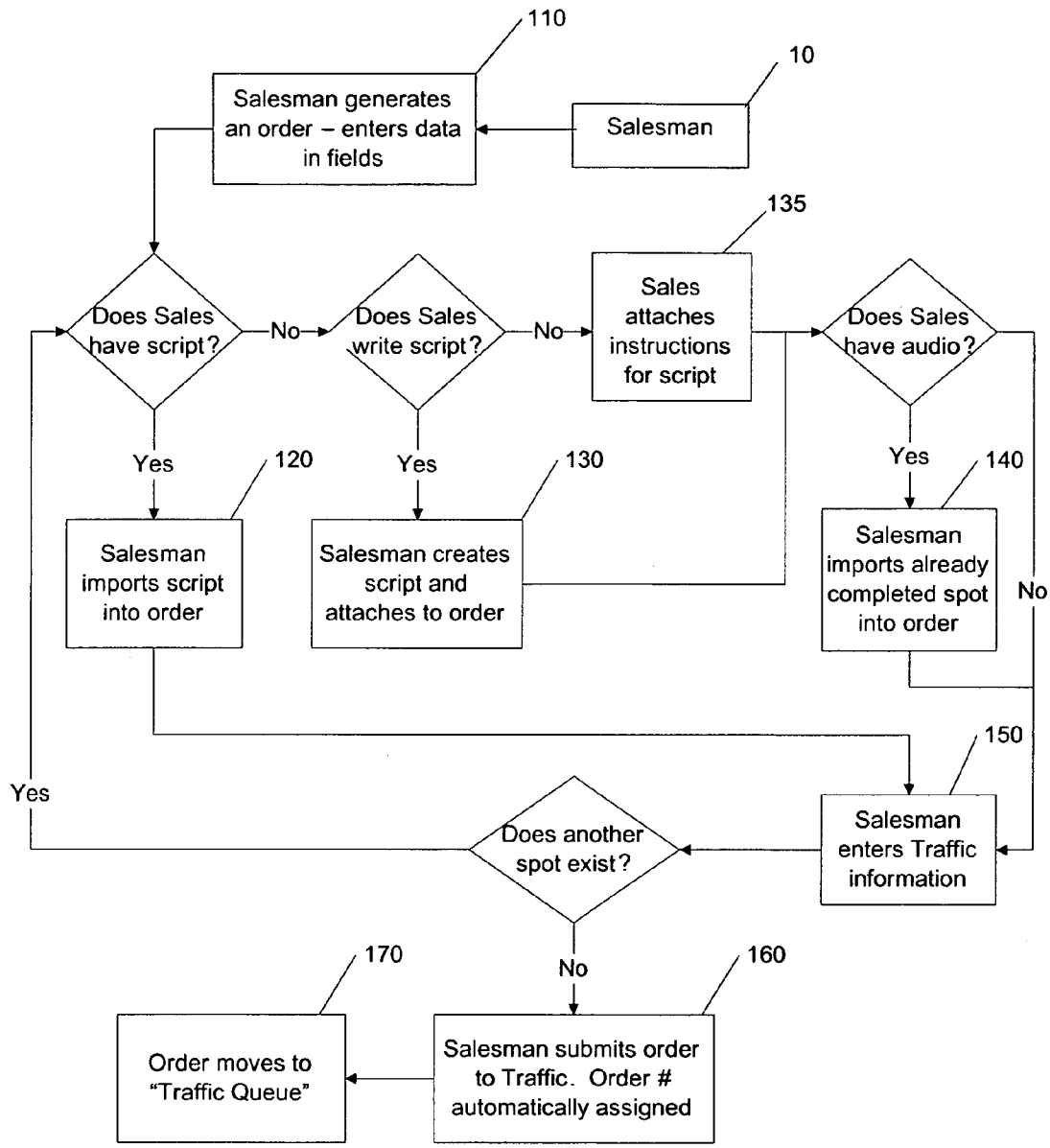
FIG. 2 depicts an example of an embodiment of a sales module of the method for automated order production for a broadcast station.

As shown in FIG. 2, the method initially requires the salesman 10 to generate an order and spot information in a database to produce a recorded announcement (Step 110). The salesman 10 can be resident at the broadcast station, such as the radio station, or in communication via the internet or by a phone system that communicates with a computer linked to the database. The computer, in turn, communicates to the broadcast station 8. Alternatively, the salesman 10 can be the employee of the station, such as the account executive, an assistant to the salesman, an advertising agency representative to the broadcast station, a programming staff member of the radio, television or other broadcast station, or an agent or other third party contractor to the station. The tasks performed by the salesmen can be automatically processed, such as by a computer or other automated means.

The order generated by the salesman can include a script and/or a produced spot. The order generated by the salesman can also include a traffic instruction. The script can be copy plus instructions for audio. The copy can be generated by the salesman; a staff script writer of the broadcast station; a third party contractor; a programming staff member; or the producer. The audio instruction can be instructions to obtain an audio file, instructions to record voiceovers, or instructions to obtain special effects, such as a squeaking door, gun shot, tire squeals. The audio instructions can be a combination of these instructions. The audio file comprises an MP3 audio file, a Wav audio file, an AIF audio file, a WMA audio file, or an MP2, or other audio file. The audio file can be music, sound effects, voice recordings, or a combination of these. The audio file can be original, live, or recorded digital or analog.

If the salesman 10 has the copy for a spot, the salesman 10 can use an import function in the program to import the copy into the order for storage in the database (Step 120). The copy can be linked to the spot in the database and saved in a file, such as an .rtf file.

If the salesman 10 does not have the copy for a spot, the salesman 10 can write the copy and attach the copy or script to the order for storage in the database (Step 130). The copy can be linked to the spot in the database and saved in a file, such as an .rtf file. If the salesman 10 does not have the copy and cannot write the script, the salesmen 10 attached instruction to the order concerning the script (Step 135).

If the salesman 10 has audio for the spot, the salesman 10 can attach the audio and import the completed spot into the order (Step 140). The copy can be linked to the spot in the database and saved in a file, such as an .mp3 file.

In an alternative embodiment, the salesman 10 can be asked to verify if the audio is properly licensed such as from ASCAP, BMI, or Harry Fox. The database can be used to verify licensing automatically of all imported audio files and would provide a significant savings to the radio station.

Continuing with FIG. 2, once the copy, script and audio, as necessary, has been entered in to the database, the salesman 10 enters traffic instructions (Step 150) and enters the information into the database. If another spot exists, the salesman 10 repeats the steps involved with incorporated script and any audio into the next spot.

The salesman 10 submits the completed order or orders to the traffic director for scheduling with an order number (Step 160). An order number is assigned either manually or automatically. The module ends by assigning the order a first location that is termed here "traffic queue" (Step 170).

Figure 3:
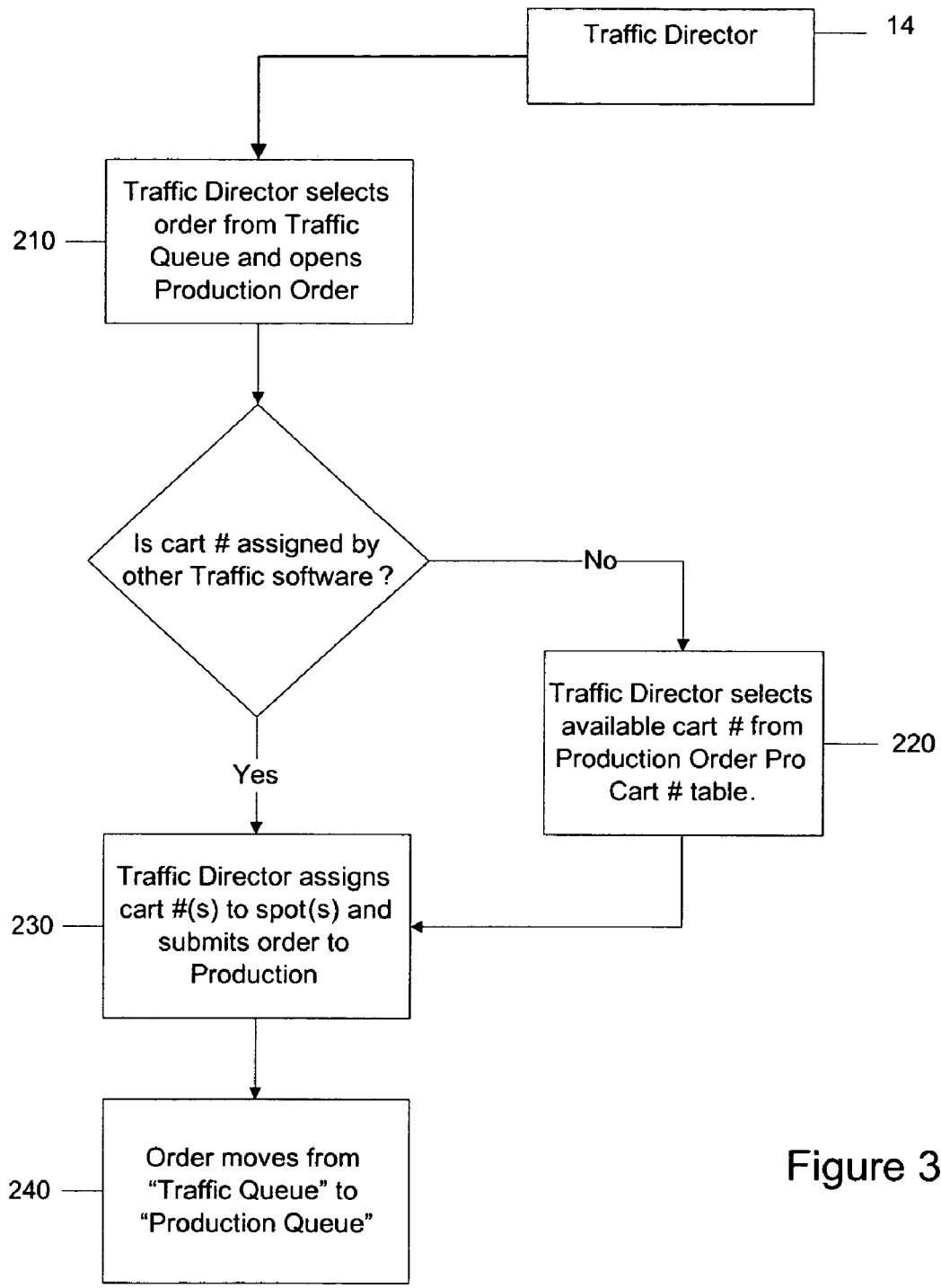
FIG. 3 depicts an example of an embodiment of a traffic director module of the method for automated order production for a broadcast station.

FIG. 3 depicts an example of the traffic module usable in the method. The traffic director 14 reviews a traffic queue populated by the salesman 10 in the sales module for spots to be scheduled and produced for air play. The traffic director 14 selects an order from the traffic queue produced by the software associated with the database. (Step 210). The traffic director 14 opens a production order. The actions performed by the traffic director 14 can be done manually or automatically, wherein the traffic director 14 can be a person, a computer, or other automated means.

If the order includes a cart number, the traffic director 14 selects a cart number from the cart number table (Step 220). The cart table can be the software's cart table or the traffic director's external cart table. The cart number can be assigned manually or automatically. The traffic director 14 saves the cart number, order, and script. Once a cart number has been assigned to the order, the traffic director 14 submits the order to production (Step 230). The saved production order with attached cart number and script are linked to a second location, hereafter referred to as the "production queue" (Step 240). The traffic direction 14 moves the order from the traffic queue to the production queue.

Figure 4:
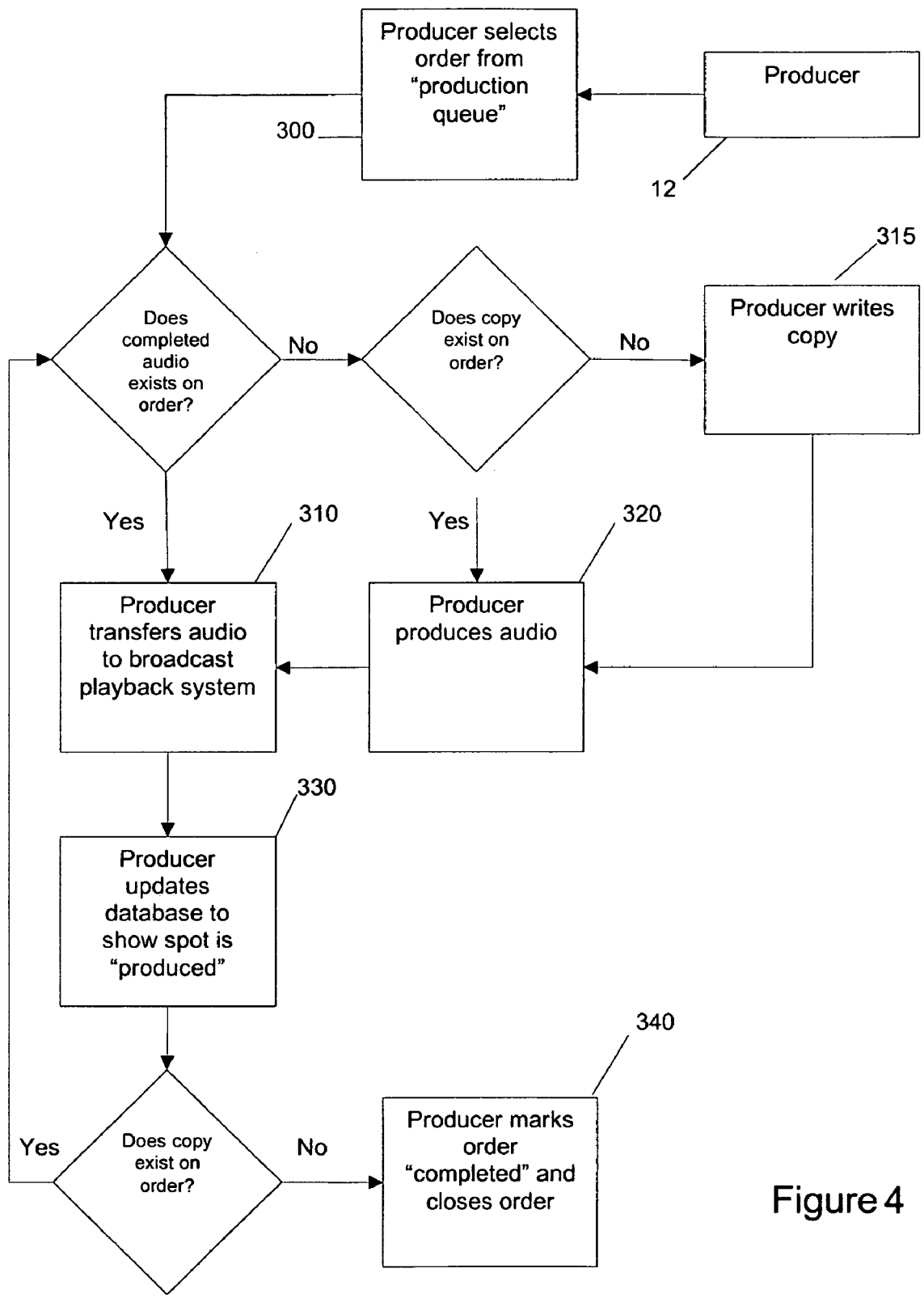
FIG. 4 depicts an example of an embodiment of a production module of the method for automated order production for a broadcast station.

FIG. 4 depicts an example shows the production module usable in the method. A producer 12 can call up or retrieve the order from the second location, the "production queue" (Step 300). The producer begins production of the recorded announcement. To produce the recorded announcement, the producer 12 determines whether the audio and copy exists for the order. The actions performed by the producer 12 can be done manually or automatically, wherein the producer 12 can be a person, a computer, or other automated means.

If the completed audio exists in the database, the producer 12 transfers the audio file into the station's playback system (Step 310). If the completed audio does not exist in the database, the producer 12 can create the audio (Step 320). The producer 12 can create the audio by locating needed audio and optionally hiring actors to perform in order to complete production. The producer 12 can create a soundtrack by finding desired music on the Internet, finding musicians to make the music, or locating the music from another source. The audio can be imported using an audio function in the software. Alternatively, the audio can be recorded to the database using an audio function in the software. The imported or recorded audio file is typically linked to the spot in the database and saved in a file, such as an MP3 file. The step of importing the audio file by the producer 12 is similar to the importing the audio file by the salesmen in the sales module.

If the order does not include a script, the producer 12 can create copy by writing and, optionally, reading the copy himself (Step 315). If the producer is a computer, the computer can use voice recognition and response software to produce words for recording. If special effects are required, the producer 12 can include the effects into the audio.

Special effects are identified by the producer to enhance the script. Special effects can include noises, such as door closings, squeaks, echoes, or the sound of thunder. The producer 12 records the assembled elements to form the recorded announcement. The final recorder product is transferred to the playback system (Step 310). The recorded announcement can be a commercial, a traffic report, an infomercial broadcast, a public service announcement, a station promotional announcement, station imaging element, or a combination of these.

The producer 12 is responsible to alter the status of the order by updating the database (Step 330). If multiple recorded announcements are present on the order, the producer 12 produces the announcements and updates the status of each recorded announcement. For example, the producer 12 sends or "reads" the recorded announcement to broadcast station equipment and changes the recorded announcement status from "to be produced" to the status of "produced".

If another copy exists on the order, the producer 12 repeats the steps involved with producing the spot and transferring the audio to the playback system. When entire order is completed, the producer 12 closes the order and marks the order, for example, as "completed", in the database (Step 340).

The recorded announcement is saved in the database at a third location, wherein the announcement can be called up for review or broadcast. The broadcast can be live or a delayed later broadcast. The producer 12 can provide a list of all recorded announcements to be produced on a given date in order to facilitate the efficient operation of the broadcast station.

The broadcast of the recorded announcement is managed by the station's playback system, typically a computer. The signal is automatically transmitted to a transmitter for broadcast over airwaves via the internet, via cable, via satellite, or other common means. The defined time can be a delayed broadcast of the recorded announcement, an immediate broadcast of the recorded announcement, or combinations thereof.

If another spot needs to be produced, the producer 12 selects the next spot to produce from the same order. Individual recorded announcements are produced and marked as "produced" in the status field until the entire order is complete. The entire order is then marked "complete".

Figure 5:
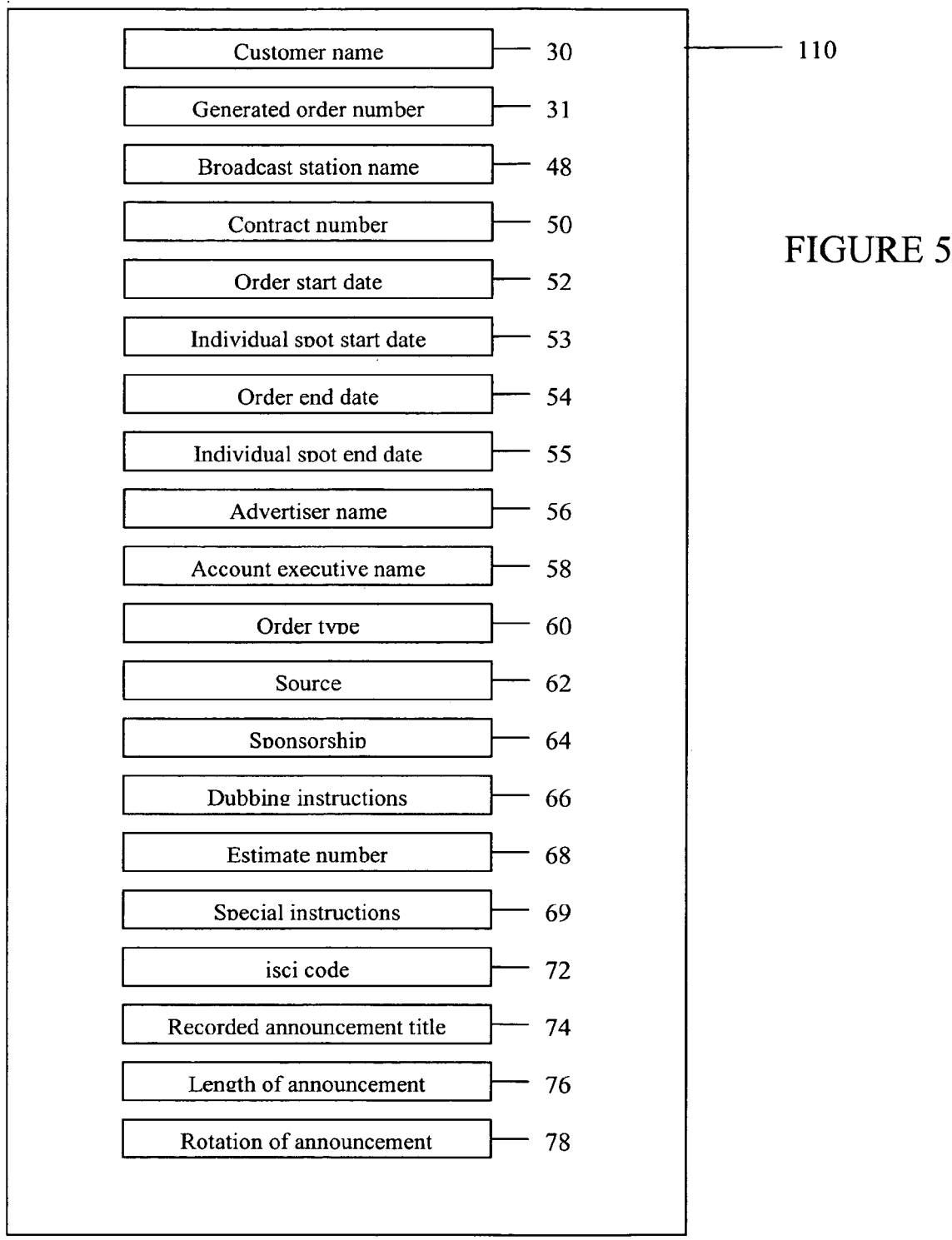
FIG. 5 depicts examples customer and order information used in the sales module.

Returning to the sales module depicted in FIG. 1, FIG. 5 depicts a detailed segment of the sales module used in the method to allow a salesman, his assistant or other party to enter production orders and submit the production orders to traffic department for scheduling.

The salesman 10 typically receives an order. The salesman 10 can be a self-service kiosk in which a customer can enter order information. If the salesman 10 is a kiosk, the kiosk can include a computer that is linked to the database at the broadcast station. The self-service kiosk can include a credit card swipe system to pay for the commercial.

Once the salesman 10 has received the order, the salesman 10 generates an order in the database (Step 110) and enters information into the database. An order number is generated when the salesman 10 submits the order to the traffic queue. The generated order number 31 as well as the customer name 30 is included in the database. The salesman 10 can enter other information, such as the broadcast station name 48, a contract number 50, and a start date 52 for the entire order. One or more individual start dates 53 can be added for individual recorded announcements. The start dates can be later than the start date for the entire order. The start date can include the time, the day, the month and the year that the order is to be started at a broadcast station. An order end date 54 can be entered. The end date is the date that all individual recorded announcements are completed airing at the broadcast station. Similar to the individual start dates 53, the individual end dates 55 can be entered by the salesman 10 for individual end airing dates for individual recorded announcements.

The salesman 10 can enter into the order an advertiser's name 56, which can optionally appear on the recorded announcement. The salesman 10 can enter the name of the account executive 58, typically the salesman's name. Alternatively, an order type 60 can be inserted in the recorded announcement order. The order type 60 indicates the usage of the finished recorded announcement, such as broadcast over airwave or broadcast via the Internet. Additionally, the source 62 of one or more of the script elements or the ordered recorded announcement can be included in the order.

The salesman 10 can enter additional terms, such as sponsorship 64, dubbing instructions 66, and an estimate number 68. Special instructions 69 can be input into the order, such as use a female voice or use acoustic guitar music. Dubbing instructions can include instructions to make a CD or DVD of the recorded announcement for the client, to make a cassette, to make an MP3 version of the recorded announcement, or similar dubbings or copying instructions. The dubbing instructions can indicate if the dubbing is to be a digital or analog recording or a "gold master" of the recorded announcement.

Continuing with the FIG. 5, the salesmen 10 can enter other information, such as an ISCI code 72 for the order, a recorded announcement title 74, or a length for the recorded announcement 76, such as fifteen seconds, thirty seconds, or sixty seconds. The rotation of the recorded announcement 78 can be entered as well. A rotation can be 100% if only one recorded announcement is in the order. If multiple announcements exist on the order, their total rotation should equal 100%. The rotation can be indicated as 20% for a first recorded announcement in an order and 80% for a second recorded announcement in the same order.

The customer information, order information, spot information, any address, and the other loaded information are stored in a database in a computer, a server, a website, over a LAN or WAN, or combinations of these.

Other fields that can be entered into the database described above for the order. Examples of these fields include a contact agency, such as the name of the advertising agency that provided the order; a contact phone number, a contact cell phone number, a contact fax number, a web address, and an E-mail address.

The audio file and/or the script can be e-mailed to the client for pre-approval prior to finalizing the recorded announcement. The emailing prior to final production and optional emailing a second time prior to broadcast saves postage saves paper and ensures station compliance with customer requests. This cost saving benefit of the method makes radio station more profitable.

While this method has been described with emphasis on the preferred embodiments, it should be understood that within the scope of the appended claims, the method might be practiced other than as specifically described herein.

What is claimed is:

1. A computer assisted method using a software program with an integrated sales module, an integrated traffic module, and an integrated production module for tracking and storing order information, and for producing a video or audio recorded announcement for a broadcast station using the order information, the computer assisted method comprising:
   a. generating an order in a database on at least one computer to produce a recorded announcement by a salesman using the order information and the integrated sales module on the software program at the broadcast station with a script and traffic instructions; wherein the script comprises audio instructions and copy; wherein the software program flirt her comprises an import function and an audio function;
   b. importing the copy into the order using the import function on the software program;
   c. storing the script and the order using the software program at a first location in the database by the salesman;
   d. retrieving the order from the database by a traffic director using the integrated traffic module on the software program for scheduling at the broadcast station using the traffic instructions, and assigning a cart number and storing the script and the assigned cart number at a second location in the database;
   e. retrieving the stored script, the order and the assigned cart number from the second location by a producer using the integrated production module on the software program at the broadcast station, f. the producer locating audio instructions, copy, or combinations thereof required in the script, importing audio to the database using the audio function, forming a stored recorded announcement at a third location with the order in the database; and g. retrieving the stored recorded announcement for use by the broadcast station, forming the programming element.

2. The computer assisted method of claim 1, wherein the step of generating the order further comprises the steps of:
   a. entering a customer name;
   b. entering the name of the broadcast station;
   c. entering a contract number;
   d. entering a start date for order;
   e. entering an end date for order;
   f. entering a start date for at least one individual recorded announcement;
   g. entering an end date for at least one individual recorded announcement;
   h. entering an advertiser's name;
   i. entering a salesman's name;
   j. entering a source of at least one element for the recorded announcement;
   k. entering a sponsorship for the recorded announcement;
   l. entering dubbing instructions;
   m. entering an estimate number;
   n. entering special instructions;
   o. entering isci code;
   p. entering a recorded announcement title;
   q. entering a length of the recorded announcement; and
   r. entering a rotation of each recorded announcement in the order.

3. The computer assisted method of claim 2, wherein the start date for the order comprises the time, day, month and year that one of a group of recorded announcements is to begin running at the broadcast station.

4. The computer assisted method of claim 3, wherein the end date for the order comprises the time, day, month, and year that all of the group of recorded announcements are to stop running at the broadcast station.

5. The computer assisted method of claim 2, wherein the dubbing instructions are selected from the group consisting of:
   a. a request for a CD of the recorded announcement;
   b. a request for an Mp3 copy of the recorded announcement;
   c. a request for a cassette of the recorded announcement; or
   d. combinations thereof.

6. The computer assisted method of claim 1, wherein the copy is generated by a member selected from the group consisting of the salesman, a staff script writer of the broadcast station, a third party contractor, a programming staff member, and the producer.

7. The computer assisted method of claim 1, further comprising the steps of linking the copy to the order and saving the copy linked to the order at the first location.

8. The computer assisted method of claim 1, wherein the audio instructions are selected from the group consisting of:
   a. instructions to obtain an audio file;
   b. instructions to obtain special effects;
   c. instructions to record voiceovers; or
   d. combinations thereof.

9. The computer assisted method of claim 8, wherein the audio file comprises an MP3 audio file, a WAV audio file, an AIF audio file, a WMA audio file, or an MP2 audio file.

10. The computer assisted method of claim 1, wherein the traffic director is a second computer.

11. The computer assisted method of claim 1, wherein the producer is a third computer.

12. The computer assisted method of claim 11, wherein the third computer comprises voice recognition and response software, further comprising the step of:
   a. producing words for recording using the voice recognition and response software, for producing the recorded announcement.

13. The computer assisted method of claim 1, wherein the broadcast station is a broadcast radio station, a broadcast television station, a satellite radio station, a satellite television station, an Internet radio station, an Internet television station, a cable radio station, a cable television station, or a network of these stations.

14. The computer assisted method of claim 1, wherein the recorded announcement is a traffic report, a commercial, an infomercial, a public service announcement, a station promotional announcement, a station imaging element, or a political announcement.

15. The computer assisted method of claim 1, wherein the database is resident on the computer, a server, a LAN, a website, or combinations thereof.

16. The computer assisted method of claim 1, further comprising the step of providing an order status to the order at each step of the process.

17. The computer assisted method of claim 16, wherein the order status is selected from the group consisting of at the time the order entered the order status is "new", at the time a cart number is assigned to the order, the order status is "scheduled", and at the time the recorded announcement is produced, the order status is "completed".

18. The computer assisted method of claim 16, further comprising the step of advising the traffic director that an order is a replacement of a previous order.

19. The computer assisted method of claim 1, wherein the salesman is a salesman of the broadcast station, an assistant to the salesman at the broadcast station, or a member of an ad agency that supports the broadcast station.

* * * * *